United States Patent
Han et al.

(10) Patent No.: US 6,898,357 B2
(45) Date of Patent: May 24, 2005

(54) METHOD OF FABRICATING AN OPTICAL FIBER PREFORM USING MCVD AND NONLINEAR OPTICAL FIBER FABRICATED USING THE METHOD

(75) Inventors: Won-Taek Han, Gwangju (KR); Jung-Sik Cho, Chollanam-do (KR)

(73) Assignees: Optonest Corporation (KR); K-JIST (Kwangju Institute of Science and Technology) (KR)

( * ) Notice: Subject to any disclaimer, the term of this patent is extended or adjusted under 35 U.S.C. 154(b) by 216 days.

(21) Appl. No.: 10/099,189

(22) Filed: Mar. 15, 2002

(65) Prior Publication Data

US 2002/0131736 A1 Sep. 19, 2002

(30) Foreign Application Priority Data

Mar. 16, 2001 (KR) ......................................... 2001-13531

(51) Int. Cl.[7] .............................. G02B 6/16; G02B 6/10; C03B 37/022; C03B 37/018
(52) U.S. Cl. ....................... 385/122; 385/122; 385/123; 65/385; 65/416
(58) Field of Search .............................. 385/122–128; 65/385, 413, 427–428, 417–419

(56) References Cited

U.S. PATENT DOCUMENTS 5,917,969 A * 6/1999 Gavrilovic et al. ........... 385/15
2001/0008077 A1 * 7/2001 Berkey ......................... 65/403
2003/0031443 A1 * 2/2003 Soljacic et al. .............. 385/125
2003/0044158 A1 * 3/2003 King et al. .................. 385/142
2003/0044159 A1 * 3/2003 Anderson et al. ........... 385/142

* cited by examiner

Primary Examiner—Akm Enayet Ullah
Assistant Examiner—Kevin S. Wood
(74) Attorney, Agent, or Firm—Harness, Dickey & Pierce, P.L.C.

(57) ABSTRACT

A method of fabricating an optical fiber preform using a modified chemical vapor deposition method and a nonlinear optical fiber fabricated using the method. The method comprises the steps of: forming a cladding layer and a core layer in a quartz glass tube; partially sintering the core layer; partially shrinking both ends of the quartz glass tube, in which the cladding layer and the core layer partially sintered are formed; and doping a sintered portion of the core layer with an impurity component, so that the optical fiber preform fabricated has a predetermined function. The nonlinear optical fiber being fabricated by a process comprising the steps of: forming the cladding layer and the core layer in a quartz glass tube; partially sintering the core layer; partially collapsing both ends of the quartz glass tube; and doping a sintered portion of the core layer with a predetermined impurity component.

4 Claims, 13 Drawing Sheets

METHOD OF FABRICATING AN OPTICAL FIBER PREFORM USING MCVD AND NONLINEAR OPTICAL FIBER FABRICATED USING THE METHOD

BACKGROUND OF THE INVENTION

1. Field of the Invention

The present invention relates to a method of fabricating an optical fiber preform using a modified chemical vapor deposition method and a nonlinear optical fiber fabricated using the method, in which the optical fiber is provided with a specific function by adding a particular dopant.

2. Description of the Related Art

An optical fiber utilized in optical communications is an element, in which light is transmitted by means of total reflection due to a difference of optical refractive indices between a cladding portion, which is made from quartz glass of high purity, and a core portion, in which elements such as germanium (Ge) are added to silica glass to slightly heighten the optical refractive index.

In general, the process of fabricating the optical fiber is further divided into a process of fabricating an optical fiber preform and a process of drawing an optical fiber from the optical fiber preform. The process of fabricating an optical fiber preform is accomplished by utilizing such methods as a modified chemical vapor deposition (MCVD) method, a vapor-phase axial deposition (VAD) method, and an outside vapor deposition (OVD) method.

Further, in order to provide the optical fiber with a particular functionality, after a core layer is deposited and partially-sintered in an MCVD process, a solution containing a dopant is added to the sintered portion of the core layer.

FIG. 1 is a flow chart for showing a process of fabricating a functional optical fiber preform according a general MCVD method.

First, a raw gas such as $SiCl_4$, $POCl_3$, $CF_4$, and $GeCl_4$ together with oxygen is blown into a quartz glass tube, and the quartz glass tube is heated by a heating means. Then, oxidized sediment like soot is formed on the inside of the quartz glass tube due to a thermal oxidation reaction, thus forming a cladding layer and a core layer (steps ST1 and ST2).

Thereafter, the core layer is partially sintered, and then doped with a dopant, so as to have a particular functionality (step ST3).

Further, the portion doped with the dopant is dried, and sintered accompanying oxidation (step ST4).

Thereafter, the sintered optical fiber is subjected to a collapsing step and a sealing step, so that the fabrication of an optical fiber preform is completed (steps ST5 and ST6).

In this case, the above doping steps ST3 and ST4 are carried out by means of an apparatus as shown in FIG. 2, described in detail hereinafter with reference to FIGS. 3A to 3D.

As shown in FIG. 3A, a cladding layer 32 and a core layer 33 are formed on the inside quartz glass tube 31, and as shown in FIG. 2, the quartz glass tube 31 is connected to a flask 10 through a Teflon connector 20.

In this case, the flask 10 contains a solution S containing a dopant to dope the quartz glass tube 31, and has a gas injection/exhaust port 11, through which a suitable gas such as argon (Ar) is injected to supply the solution S into the quartz glass tube 31.

In other words, in a state that the quartz glass tube 31 and the flask 10 are connected with each other through the Teflon connector 20, when a predetermined quantity of argon gas is injected into the gas injection/exhaust port 11 of the flask 10, the solution S contained in the flask 10 is injected into the quartz glass tube 31 through the Teflon connector 20 by the pressure due to the injection of the gas. That is, the quartz glass tube 31 is maintained in a state as shown in FIG. 3B.

Thereafter, when a predetermined time has passed, the argon gas is exhausted through the gas injection/exhaust port 11 of the flask 10. Then, the solution S remaining in the quartz glass tube 31 returns to the flask 10 through the Teflon connector 20. That is, as shown FIG. 3C, the sintered portion of the core layer is doped with the solution.

However, since the apparatus shown in FIG. 2 is to carry out only the doping process, other processing steps such as the steps of forming a cladding layer and a core layer in a quartz glass tube, a sintering step, a collapsing step, and a sealing step must be carried out by a conventional apparatus for the MCVD process.

Therefore, after a cladding layer and a core layer are formed in a quartz glass tube by means of a conventional MCVD processing apparatus, the quartz glass tube is removed to an additional apparatus to carry out the doping process. Then again, the quartz glass tube having completed the doping step is installed in the conventional MCVD processing apparatus for the subsequent steps, thus complicating the process of fabricating an optical fiber perform.

Moreover, when the apparatus, as shown in FIG. 2, carries out the doping process, the quartz glass tube is set upright, filled with the solution containing a dopant for a predetermined time, and then exhausted, so that some of the dopant filling the sintered portion of the core tends to escape along with the solution. This results in deterioration of the functional characteristic imparted by the doping of the optical fiber perform, as shown in FIG. 3D.

Meanwhile, the recent development of the optical communications technology requires high-speed nonlinear optical elements such as an optical modulator, an optical switch, and an optical isolator. As an endeavor in order to produce such nonlinear optical elements, a research for doping an optical fiber with semiconductor fine particles is in progress.

However, in the conventional method of fabricating an optical fiber preform as described above, there is a difficulty in doping semiconductor fine particles of nano-size, which is larger than that of existing dopants.

Further, the doping apparatus as described above limits the sintered portion of the core layer, and thus limits doping quantity of the dopant.

This adversely affects the characteristic of a functional optical fiber, especially that of the non-linear optical fiber, which is influenced by the doping quantity of the dopant.

SUMMARY OF THE INVENTION

Accordingly, the present invention has been made in an effort to solve the problems occurring in the related art, and it is an object of the present invention to provide a method of fabricating an optical fiber preform using a modified chemical vapor deposition method and a nonlinear optical fiber fabricated using the method, in which the core layer of the optical fiber preform can be uniformly doped with a dopant, and the doping quantity of the dopant can be increased.

It is another object of the present invention to provide a method of fabricating an optical fiber perform using a modified chemical vapor deposition method.

It is still another object of the present invention to provide a nonlinear optical fiber fabricated using the method, which has been doped with semiconductor fine particles of relatively large size to have a stable nonlinear characteristic.

It is still another object of the present invention to provide an optical fiber.

It is still another object of the present invention to provide a method of fabricating a planar optical waveguide circuit.

It is still another object of the present invention to provide a planar optical waveguide circuit.

In accordance with one aspect, the present invention provides a method of fabricating an optical fiber perform with a desired function using a modified chemical vapor deposition method, the method comprising the steps of: forming a cladding layer and a core layer on the inside of a quartz glass tube; partially sintering the core layer; partially shrinking the diameter of the quartz glass tube with the cladding layer and the partially sintered core layer at two positions near both ends thereof; and doping the sintered portion of the core layer with a dopant.

In accordance with another aspect, the present invention provides a nonlinear optical fiber comprising a cladding layer and a core layer, the nonlinear optical fiber being fabricated by a process comprising the steps of: forming the cladding layer and the core layer in a quartz glass tube; partially sintering the core layer; partially shrinking the diameter of the quartz glass tube at two positions near both ends thereof; and doping the sintered portion of the core layer with a particular dopant.

Namely, after shrinking the diameter of a quartz glass tube at both ends thereof, the sintered core layer is doped with a material containing a dopant, especially semiconductor fine particles of nano-size, so that the doping process can be stably executed by means of a conventional apparatus of fabricating an optical fiber perform without an additional apparatus, thereby making it possible to obtain a nonlinear optical fiber having stable characteristics. It is preferred that the dopant comprises at least one of PbTe, PbS, SnTe, CuCl, CdS, and CdSe.

According to a still another aspect of the present invention, there is provided with a nonlinear optical fiber, which is comprising a cladding layer, a core layer, wherein the core layer is doped with semiconductor fine particles of nano-size. In this case, the semiconductor fine particles comprises at least one of PbTe, PbS, SnTe, CuCl, CdS, and CdSe.

According to a still another aspect of the present invention, there is proved a process of fabricating a planar optical waveguide circuit, which comprises the steps of preparing a silicon wafer, depositing a first sediment composed of $SiO_2$—$P_2O_5$ or $SiO_2$—$P_2O_5$—$B_2O_3$ on the silicon wafer by means of FHD (Flame Hydrolysis Deposition) process, sintering the first sediment in a high temperature electric furnace so as to form a buffer cladding layer, depositing on the buffer cladding layer a second sediment composed of $SiO_2$—$GeO_2$—$P_2O_5$, $SiO_2$—$GeO_2$—$B_2O_3$ or $SiO_2$—$GeO_2$—$P_2O_5$—$B_2O_3$ with a higher refractive index than the buffer cladding layer by means of FHD process so as to form a porous core layer, immersing the silicon wafer deposited with the porous core layer in a solution dissolving semiconductor fine particles of nano-size, drying the silicon wafer by removing the solution so as to form a doped core layer, and sintering the doped core layer, subjecting the doped core layer to a reactive ion etching (RIE) so as to leave a core part for serving as an optical waveguide, depositing a third sediment having the same composition as the buffer cladding layer over the buffer cladding layer and the core part by means of FHD process, and sintering the third sediment so as to form a over cladding layer. The semiconductor fine particles are preferably composed of at least one of PbTe, PbS, SnTe, CuCl, CdS, and CdSe.

According to a still another aspect of the present invention, there is provided with a planar optical waveguide circuit, which is comprising a silicon substrate; a buffer cladding layer formed on the silicon substrate; a core formed on the buffer cladding layer; and a over cladding layer formed over the buffer cladding layer and the core part, wherein the core is doped with semiconductor fine particles of nano-size. The semiconductor fine particles are preferably composed of at least one of PbTe, PbS, SnTe, CuCl, CdS, and CdSe.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

The above and other objects, characteristics, and advantages of the present invention will be apparent from the following description along with the accompanying drawings.

Figure 1:
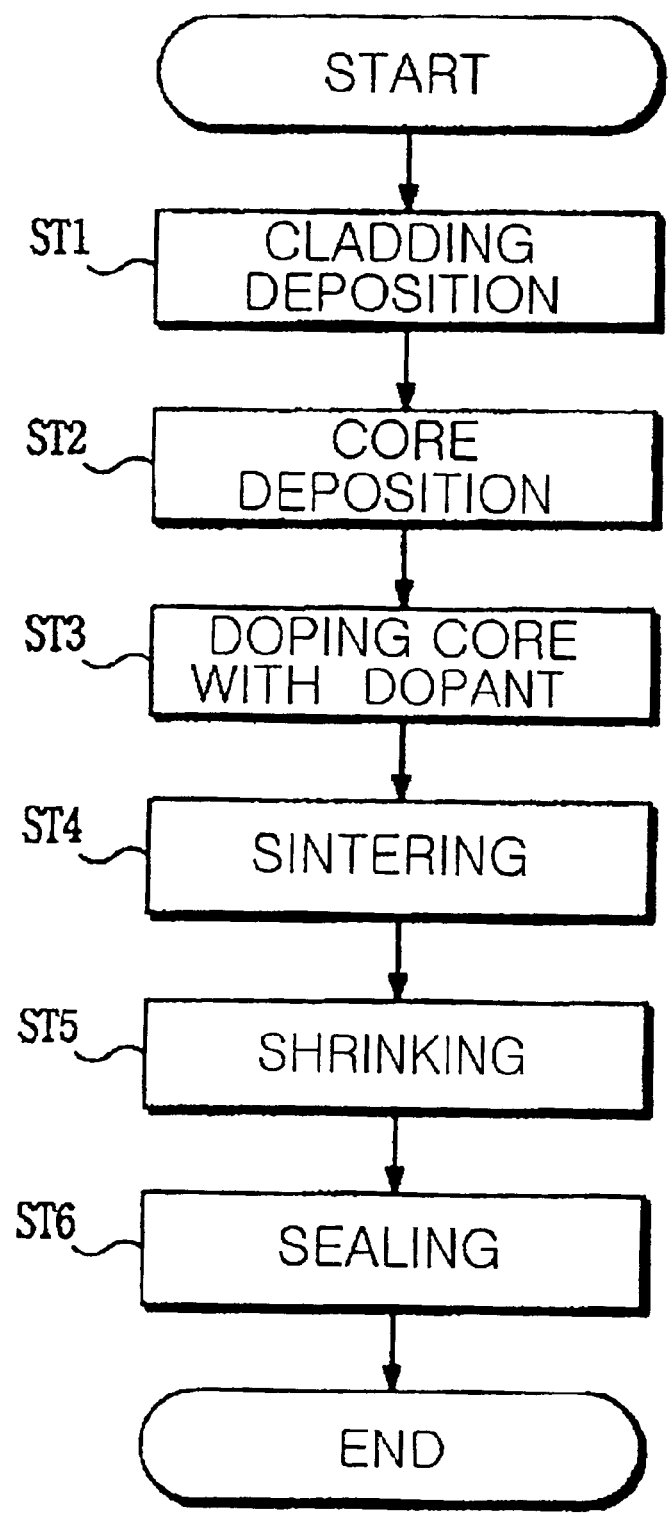
FIG. 1 is a flow chart for showing a process of fabricating a functional optical fiber preform through a general MCVD method.
Figure 2:
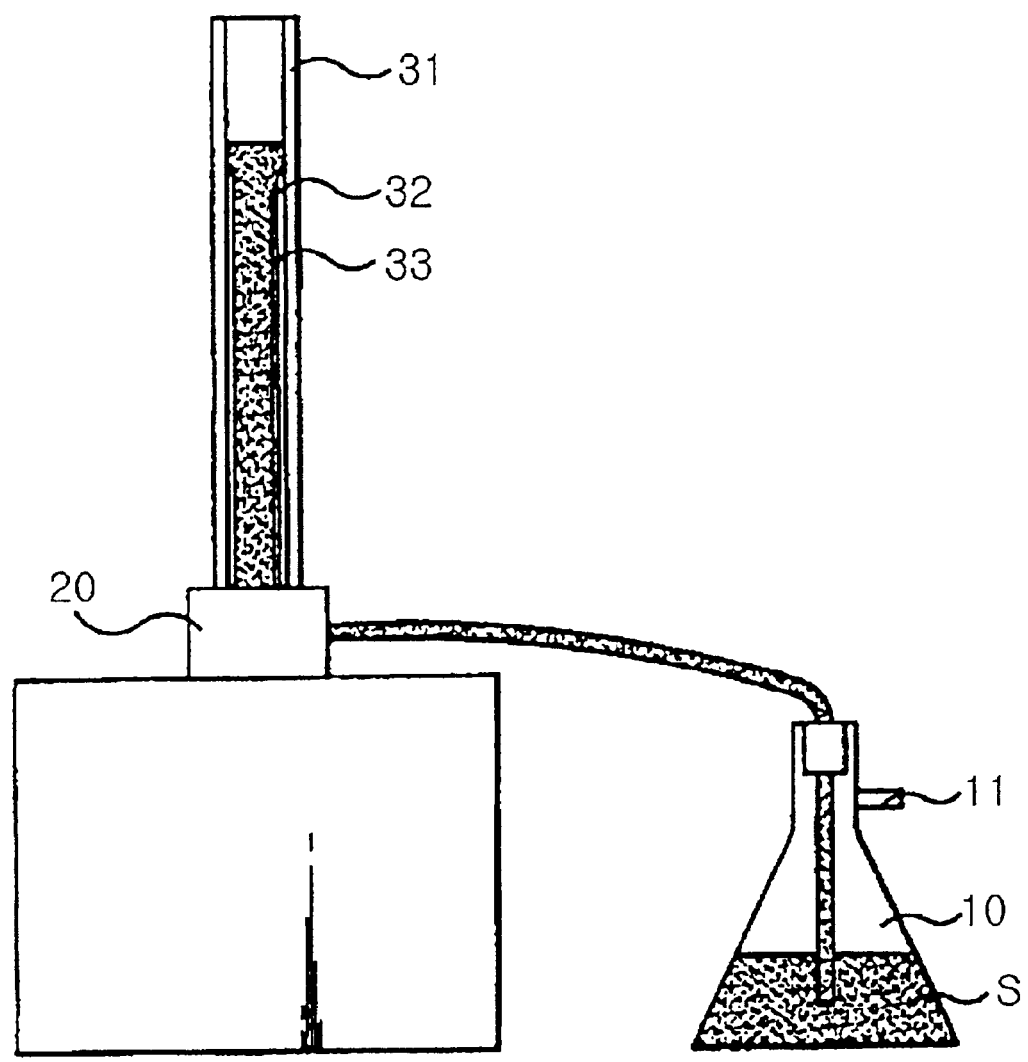
FIG. 2 is a side view of a conventional apparatus for carrying out a doping process.
Figure 3A:
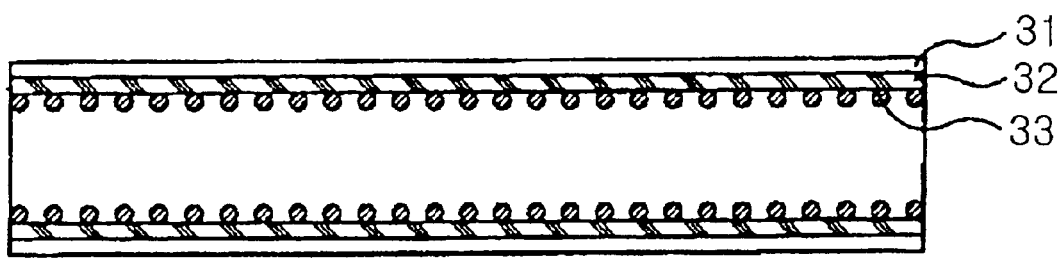
FIGS. 3A to 3D are sectional views for describing the operation of the apparatus shown in FIG. 2.
Figure 3B:
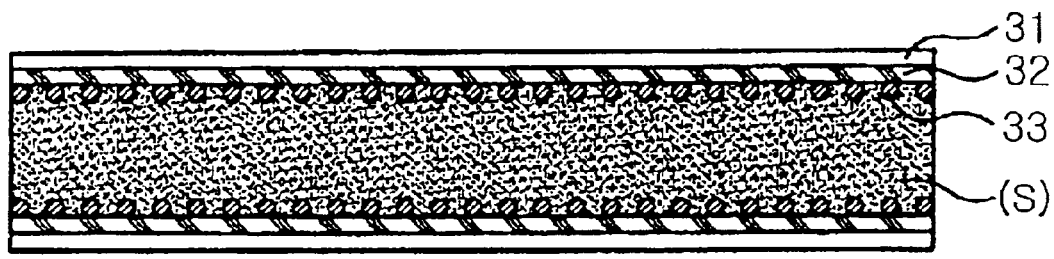
Figure 3C:
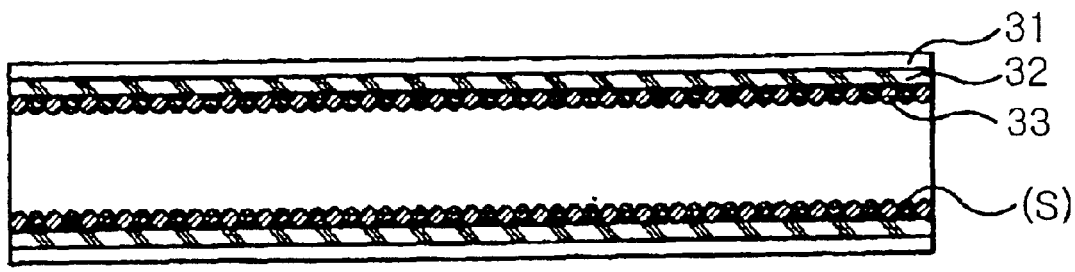
Figure 3D:
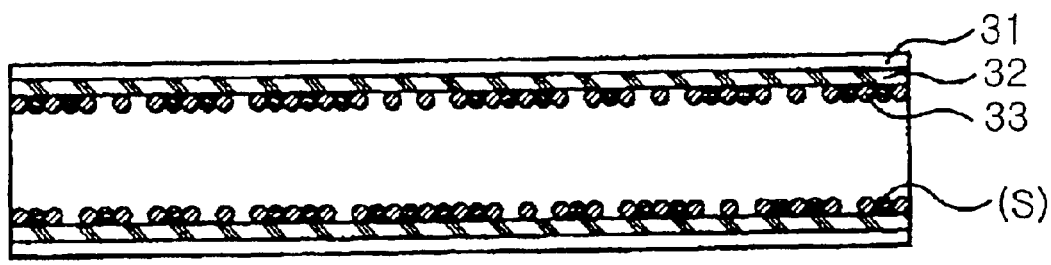
Figure 4:
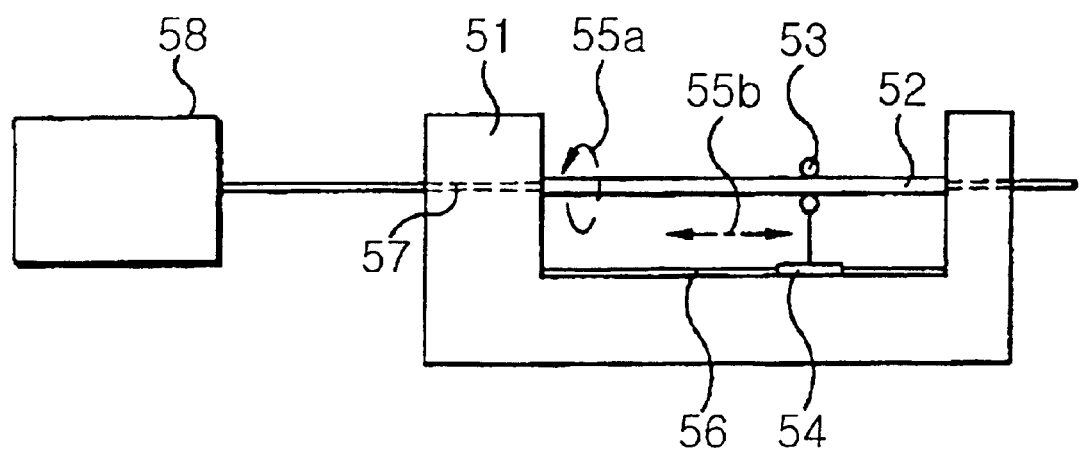
FIG. 4 is a constructional view of an apparatus of fabricating an optical fiber preform using MCVD according to a first embodiment of the present invention.

FIG. 4 is a constructional view of an apparatus of fabricating an optical fiber preform using MCVD according to a first embodiment of the present invention.

As shown in FIG. 4, in the apparatus of fabricating an optical fiber preform, a quartz glass tube 52 is held by a lathe 51, heated at a portion 53 by a heating device 54. For example, the quartz glass tube 52 is rotated in a first direction 55a, and the heating device 54 is moved in a second direction 55b by a carrier member 56. That is, the heated portion 53 of the quartz glass tube 52 is moved while being rotated.

In the meantime, a material, preferably solution, containing a substance, especially semiconductor fine particles of a few nano-size for forming a functional optical fiber perform, is injected from a material supplier 58 through an injection tube 57 into the quartz glass tube 52. In this case, the semiconductor fine particles injected into the quartz glass tube 52 from the material supplier 58 include particles consisting of at least one of, PbTe, PbS, SnTe, CuCl, CdS, and CdSe.

Hereinafter, described will be a process of fabricating an optical fiber preform using the apparatus having the above-described construction.

First, as shown in FIG. 4, in a state that the quartz glass tube 52 for forming an optical fiber preform is mounted on the lathe 51, a particular material such as $SiCl_4$, $POC_3$, $CF_4$, and $GeCl_4$, for forming a cladding layer and a core layer, is injected through the injection tube 57 into the quartz glass tube 52, together with oxygen.

Thereafter, simultaneously while the quartz glass tube 52 is rotated in the first direction 55a, the heating device 54 is moved in the second direction 55b, so as to form a cladding layer and a core layer in the quartz glass tube 52.

Further, the core layer is partially sintered, and then doped with a dopant, so as to produce a functional optical fiber preform. The doping process will be described hereinafter with reference to FIGS. 5A to 5C.

Figure 5A:
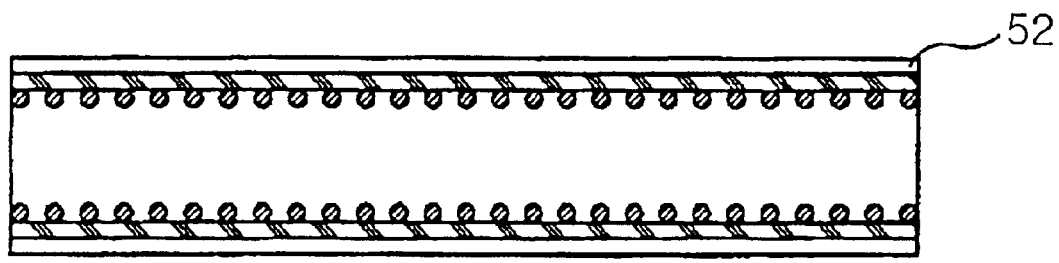
FIGS. 5A to 5C are sectional views for showing a doping process by the apparatus shown in FIG. 4.
Figure 5B:
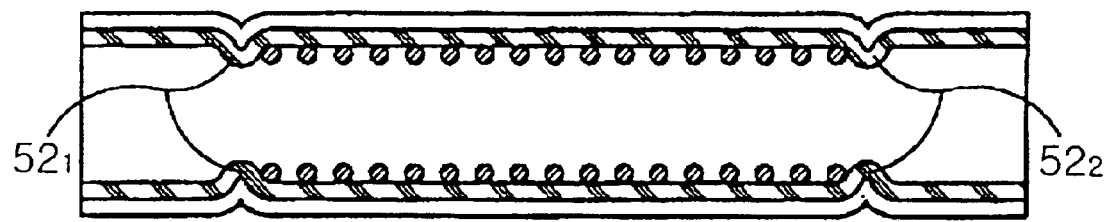

First, as shown in FIG. 5A, after a partially sintered core layer is formed on the inside of the quartz glass tube 52, the heating device 54 is moved in the second direction 55b to partially shrink the diameter of the quartz glass tube 52 at two positions near both ends thereof, as shown in FIG. 5B.

Namely, in the apparatus shown in FIG. 4, the heating device 54 is maintained fixed at a position $52_1$ near the first end of the quartz glass tube 52 for a predetermined time, so as to shrink the diameter of the quartz glass tube 52 at the position $52_1$ by a predetermined amount. Thereafter, the quartz glass tube 52 is subjected to the same treatment at a position $52_2$ near the second end as above, so as to shrink the diameter of the quartz glass tube 52 at the position $52_2$ by a predetermined amount. In this case, it is preferred that the shrinkage of the diameter of the quartz glass tube 52 at both positions is larger than or equal to the thickness of the core layer.

Thereafter, as shown in FIG. 5B, a material containing a dopant, namely functional solution, is injected from a material supplier 58 into the quartz glass tube 52 with inner annular projections formed by the shrinkage.

In this case, the functional solution containing a dopant impurity component, is so provided as to correspond to the thickness of sintered portion of the core layer and the height of the inner annular projection.

Figure 5C:
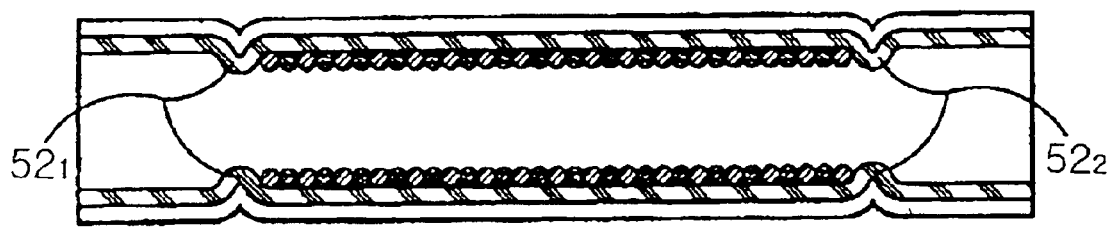

Namely, as shown in FIG. 5C, when the functional solution containing a dopant is injected into the quartz glass tube 52, the quartz glass tube 52 is rotated so that the dopant permeates the sintered portion of the core layer formed in the quartz glass tube 52 having a cylindrical shape.

In this case, since the inner annular projections of the quartz glass tube 52 have the same level with the core layer, the dopant may stably remain in the sintered portion even when the core layer has a large sintered portion. Hence, it is possible to increase the quantity of the dopant permeating the core layer.

Thereafter, the material supplier 58 makes $O_2$ and $Cl_2$ pass through the interior of the quartz glass tube 52 to eliminate the component of hydroxyl (OH) that has been generated during the doping process, and at the same time the quartz glass tube 52 is rotated in the first direction while the heating device 54 is moved in the second direction, so as to dry the dopant in the quartz glass tube 52.

Figure 6A:
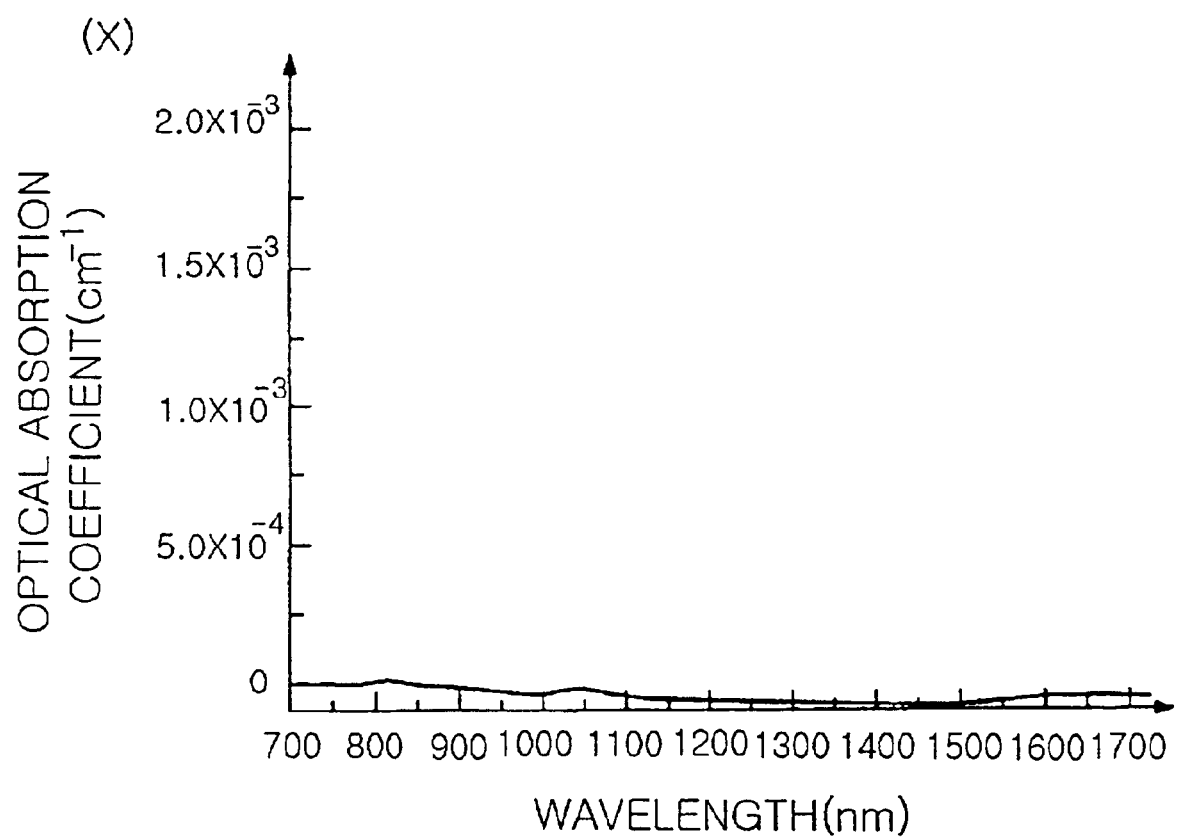
FIGS. 6A and 6B are graphs for showing the coefficients of optical absorption of nonlinear optical fibers doped with a dopant respectively according to a conventional method using the apparatus as shown in FIG. 2 and inventive method using the apparatus as shown in FIG. 4.
Figure 6B:
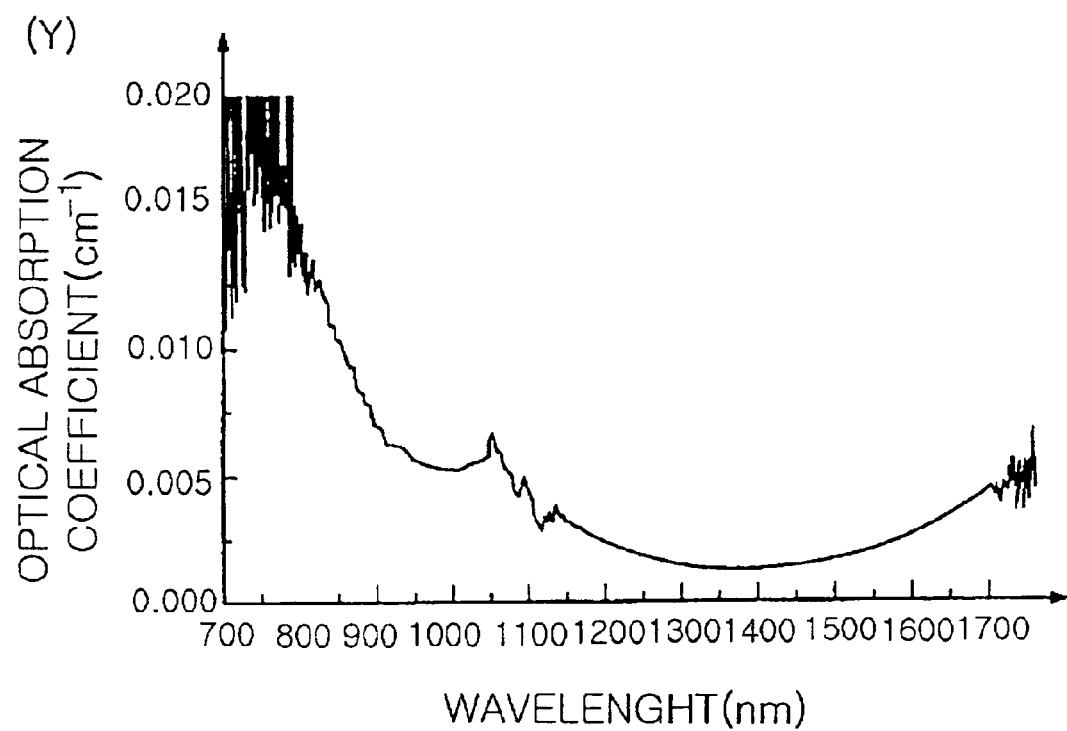

FIGS. 6A and 6B are graphs for showing coefficients of optical absorption of nonlinear optical fibers respectively doped with a dopant according to the conventional way and the method of the present invention.

FIG. 6A shows the characteristic of the optical absorption coefficient of a nonlinear optical fiber doped with semiconductor fine particles of PbTe, according to the conventional doping method, and FIG. 6B shows the characteristic of the optical absorption coefficient of a nonlinear optical doped with PbTe according to the inventive doping method employing the partial shrinkage, in which 0.05 mole of PbTe is used to dope the core layer of each of the optical fibers.

As shown in FIG. 6A, the nonlinear optical fiber doped with PbTe according to the conventional doping method, has not shown optical absorption in a wavelength range near 1050 nm, which is the natural wavelength of PbTe. This means that the optical fiber is not adequately doped with PbTe to show the nonlinear optical characteristic.

However, the nonlinear optical fiber doped with PbTe according to the partial shrinkage method of the present invention has shown, the optical absorption coefficient measured as 0.005 $cm^{-1}$ in the wavelength range near 1050 nm, as shown in FIG. 6B. This means that PbTe of nano-size remains in the core layer of the quartz glass tube.

Hence, it is noted that the inventive method provides a nonlinear optical fiber with an optical absorption coefficient generally higher in a broadband wavelength than the conventional method. This is caused by the fact that the doping concentration of same semiconductor fine particles in the core layer becomes higher using the inventive partial shrinkage method than the conventional method.

Therefore, according to the present invention, it is possible to carry out a doping process of a dopant, especially semiconductor fine particles of nano-size, and to increase the quantity of the dopant, by means of the conventional apparatus of fabricating an optical fiber preform without utilizing a separate additional apparatus.

Further, the core layer of the optical fiber preform doped with a dopant can be uniformly formed, so as to stabilize and improve the characteristics of the optical fiber attributed to the doping of the impurity component.

Figure 7:
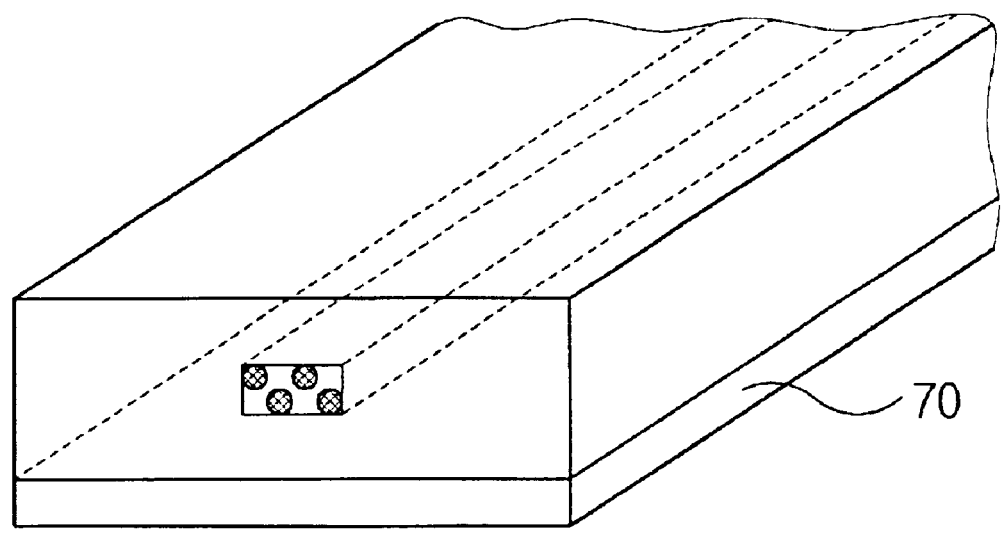
FIG. 7 is a perspective view for illustrating a planar waveguide circuit fabricated according to a second embodiment of the present invention.

According to another embodiment of the present invention, a planar optical waveguide circuit is provided as shown in FIG. 7. Hereinafter, a process of fabricating a planar optical waveguide circuit is described with reference to FIGS. 8A to 8E.

Figure 8A:
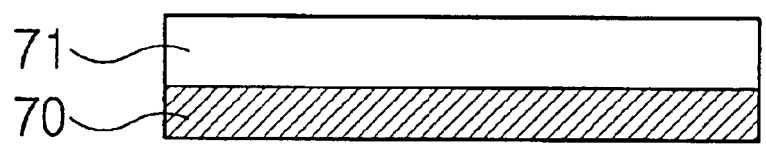
FIGS. 8A to 8E are cross sectional views for illustrating the process of fabricating the optical waveguide circuit as shown in FIG. 7.
Figure 8B:
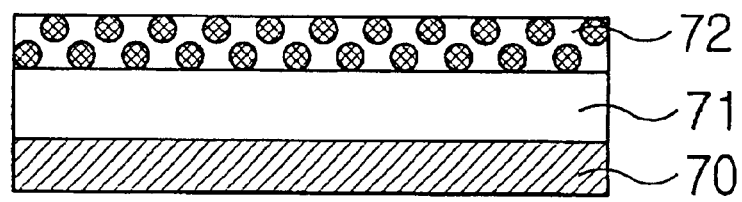

First deposited on a silicon wafer 70 is a first sediment composed of $SiO_2$—$P_2O_5$ or $SiO_2$—$P_2O_5$—$B_2O_3$ by means of FHD process, and the first sediment is sintered in a high temperature electric furnace so as to form a buffer cladding layer 71 of a glass layer(FIG. 8A). Then, deposited on a buffer cladding layer is a second sediment composed of $SiO_2$—$GeO_2$—$P_2O_5$, $SiO_2$—$GeO_2$—$B_2O_3$ or $SiO_2$—$GeO_2$—$P_2O_5$—$B_2O_3$ with a higher refractive index than the buffer cladding layer by means of FHD process so as to form a porous core layer 72 (FIG. 8B).

Figure 8C:
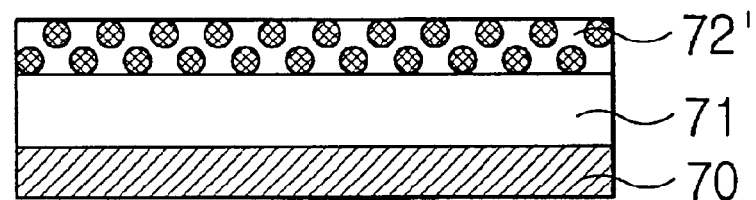
Figure 8D:
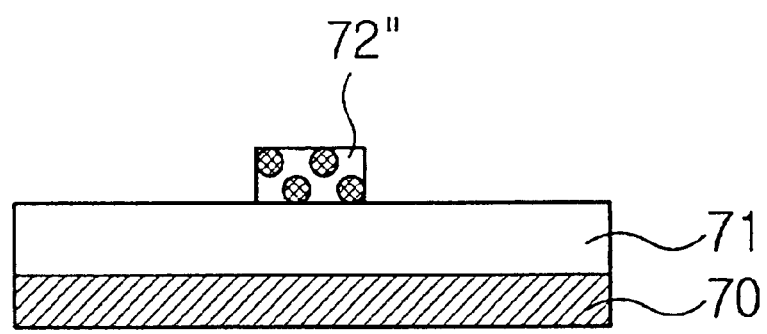
Figure 8E:
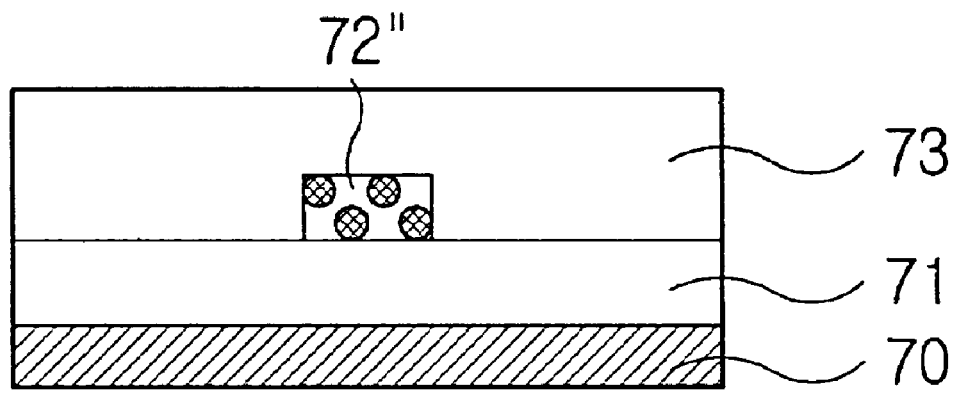

Subsequently, the silicon wafer 70 deposited with the porous core layer 72 is immersed in a solution dissolving semiconductor fine particles, and then dried by removing the solution and sintered so as to form a doped core layer 72' of glass layer, as shown in FIG. 8C. The doped core layer 72' is subjected to RIE so as to leave a core part 72" for serving as an optical waveguide, as shown in FIG. 8D. Finally, a third sediment having the same composition as the buffer cladding layer 71 is deposited over the buffer cladding layer 71 and the core part 72" by means of FHD process, and sintered so as to form a over cladding layer 73, as shown in FIG. 8E. The semiconductor fine particles of nano-size are preferably composed of at least one of PbTe, PbS, SnTe, CuCl, CdS, and CdSe.

Meanwhile, the present invention is not limited to the specific embodiments described above, but can be changed and modified in various ways without departing from the true scope of the present invention.

For example, various optical fiber elements having nonlinear characteristics and various functions, such as optical fibers for an optical switch and an optical modulator, can be produced by using various semiconductor fine particles as a dopant according to the partial shrinkage method of the present invention.

As described above, according to the present invention, the diameter of a quartz glass tube is partially shrunken at two positions near both ends thereof, and then doped with a dopant such as semiconductor fine particles, so that the doping process can be stably executed to produce a nonlinear optical fiber with stable properties by means of a conventional apparatus of fabricating an optical fiber perform without using an additional apparatus.

While there have been illustrated and described what are considered to be preferred specific embodiments of the present invention, it will be understood by those skilled in the art that the present invention is not limited to the specific embodiments thereof, and various changes and modifications and equivalents may be substituted for elements thereof without departing from the true scope of the present invention.

What is claimed is:

1. A nonlinear optical fiber comprising a cladding layer and a core layer, the nonlinear optical fiber being fabricated by a process comprising the steps of:

forming the cladding layer and the core layer on the inside of a glass tube;

partially sintering the core layer;

partially shrinking the diameter of the glass tube at two portions near both ends thereof to form two inner annular projections while the glass tube is positioned horizontally; and doping a sintered portion of the core layer with a dopant by injecting a material containing the dopant into the glass tube between the two inner annular projections while the glass tube is rotated, wherein the inner annular projections serve to maintain the dopant in the sintered portion.

2. A nonlinear optical fiber as claimed in claim 1, wherein the dopant comprises semiconductor fine particles.

3. A nonlinear optical fiber as claimed in claim 2, wherein the semiconductor fine particles comprises at least one species of semiconductor particles selected from the group consisting of PbTe, PbS, SnTe, CuCl, CdS, and CdSe.

4. A nonlinear optical fiber comprising a core layer and a cladding layer, wherein the core layer contains semiconductor particles having a dimension on the order of a nanometer and the semiconductor particles are selected from the group consisting of PbTe, PbS, SnTe, CuCl, CdS, and CdSe.

* * * * *